(12) United States Patent
Blades (10) Patent No.: US 8,511,611 B2
(45) Date of Patent: Aug. 20, 2013

(54) SLOT SEAL

(75) Inventor: Paul Blades, Bristol (GB)

(73) Assignee: Airbus Operations Limited, Bristol (GB)

( * ) Notice: Subject to any disclaimer, the term of this patent is extended or adjusted under 35 U.S.C. 154(b) by 717 days.

(21) Appl. No.: 12/783,642

(22) Filed: May 20, 2010

(65) Prior Publication Data

US 2011/0174933 A1  Jul. 21, 2011

(30) Foreign Application Priority Data

May 21, 2009  (GB) .................................. 0908751.1

(51) Int. Cl.
 *B64C 1/38* (2006.01)
(52) U.S. Cl.
 USPC ........... 244/130; 244/211; 244/212; 244/213; 244/215
(58) Field of Classification Search
 USPC ................... 244/102 R, 123.1, 129.4, 129.5, 244/130, 206, 207, 211–215, 218, 219
 See application file for complete search history.

(56) References Cited

U.S. PATENT DOCUMENTS

| 2006/0145012 | A1 | 7/2006 | Hernandez |
| 2007/0252040 | A1* | 11/2007 | Kordel et al. .............. 244/123.1 |
| 2007/0257151 | A1* | 11/2007 | Mindermann et al. ........ 244/130 |

FOREIGN PATENT DOCUMENTS

| DE | 2114459 A1 | 9/1972 |
| DE | 19716164 A1 | 10/1998 |

OTHER PUBLICATIONS

British Search Report for GB0908751.1 dated Sep. 16, 2009.

* cited by examiner

*Primary Examiner* — Tien Dinh
*Assistant Examiner* — Nicholas McFall
(74) *Attorney, Agent, or Firm* — Lowe Hauptman Ham & Berner, LLP (57) ABSTRACT

A panel assembly for an aircraft comprises a panel rotatably connected to a support structure and moveable between a first position and a second position. The panel has an aerodynamic surface with a slot at one edge thereof which receives a portion of the support structure when the panel is in the first position. The assembly further comprises a resilient seal member which occupies the slot when the panel is in the second position. The panel may be an aircraft flight control surface, or an aircraft landing gear bay door.

16 Claims, 7 Drawing Sheets

SLOT SEAL

RELATED APPLICATIONS

The present application is based on, and claims priority from British Patent Application Number 0908751.1, filed May 21, 2009, the disclosure of which is hereby incorporated by reference herein in its entirety.

FIELD OF THE INVENTION

The present invention relates to sealing of a slot in an aircraft panel. In particular, the panel may be a flight control surface or a landing gear bay door.

BACKGROUND OF THE INVENTION

Aircraft have flight control surfaces on the leading and/or trailing edges of their aerofoil sections, such as the wings, horizontal tailplane, and vertical tailplane. Common leading or trailing edge devices are slats, flaps, spoilers, ailerons, elevators, rudders and air brakes. These flight control surfaces typically operate to provide enhanced lift or drag during low speed flight, for example take-off/climb and landing/descent, or to provide pitch, roll and yaw control during any of the flight phases.

Flight control surfaces are typically mounted to their aerofoil section by a supporting hinge fitting structure. Some flight control surfaces, particularly spoilers and ailerons, may be provided with slots in their leading edges in order to provide clearance to their supporting structure when the surfaces are moved. It is generally not practicable to cut back the supporting structure to provide a clearance, due to the weight penalty of structural reinforcement to counteract the stress concentration caused by the cut back.

It is highly desirable to seal these slots in order to reduce the aerodynamic parasitic drag (and therefore fuel consumption) and noise associated with the discontinuity in the surface. Furthermore, when some flight control surfaces, e.g. wing trailing edge flaps, are deployed, a void can be opened up in the lower aerodynamic surface of the aerofoil. The slot can act with the void to form an air path between the high-pressure zone on one side of the aerofoil and the low-pressure zone on the other side of the aerofoil. The migration of air from the higher-pressure zone to the low-pressure zone is known as "cross-bleed", and can have a detrimental effect on lift performance. Since each flight control surface typically has at least two hinges, with as many a seven such surfaces on each aerofoil, the number of slots begins to have a significant effect.

Conventionally these slots are either left open and unsealed, or if the surface's kinematics and geometry allow, an attempt is made to fill the slot using deformable seals. A conventional method of sealing the slots is to provide elastomeric seals between the hinge fitting and the adjacent panels in order to fill the slots. However, the constant movement of the flight control surface over time often deforms or wears the seal to a degree that effective sealing is not possible. Constraints in the small size and need for adjustability often mean that it is impractical to fully seal the slot.

Spoilers are typically provided on the upper aerodynamic surface of the wing, between the main fixed wing portion and the trailing edge flaps. When the flaps are deployed, an effective gap is formed between the trailing edge of the spoiler and the leading edge of the flap. This gap can further enhance the lift performance of the flap. However, if this gap is too large and the continuity of the upper aerodynamic surface is not maintained, then the performance of the flap is reduced. To control the size of the gap, the spoilers are rotated downwardly or "drooped" when the flaps are deployed.

The practice of drooping spoilers poses particular problems for the sealing of the slots in the spoiler leading edge. The size of the effective slot may increase when the spoiler is drooped, exacerbating the problems described above if the slot is left un-sealed during flight phases where the preservation of high lift aerodynamic performance is particularly important. The angle of operation of a drooping spoiler will be large as the spoiler rotates in one direction when the spoiler is drooped and in the opposite direction when the spoiler is deflected upwards into the airflow. This angle of operation is often critical in determining the effectiveness and life of a slot seal. Repeated large movements could stretch the seal to the point where it is not able to return to its original shape and maintain effective sealing. Such large deflections may rule out the use of conventional elastomeric seals altogether.

Sealing of hinge slots at the edge of moveable aircraft panels is not limited to flight control surfaces and is an issue elsewhere on aircraft, e.g. landing gear bay doors. It is desirable to provide an effective sealing arrangement for all of these exposed slots.

SUMMARY OF THE INVENTION

According to the present invention, there is provided a panel assembly for an aircraft, the assembly comprising a panel rotatably connected to a support structure and moveable between a first position and a second position, the panel having an aerodynamic surface with a slot at one edge thereof which receives a portion of the support structure when the panel is in the first position, and the assembly further comprising a resilient seal member which occupies the slot when the panel is in the second position.

The present invention is advantageous in that a slot at the edge of an aircraft panel, necessary to provide clearance to a structural support when the panel is moved, can be sealed by a resilient seal member when this clearance is not required. The resilient seal member is preferably stationary in normal use and enters into the slot as the panel moves to the second position. The moveable panel seals against the seal member by means of a wiping surface, rather than a traditional compression seal. The resilient seal member provides enhanced sealing, and wear prone soft deformable seals may be eliminated as there is little comparative motion between the panel and the seal member.

Preferably, the seal member substantially fills the slot when the panel is in the second position.

The wiping surface of the seal member may be constructed by extracting the locus of the slot as the panel is moved throughout the desired sealing range. The surface generated from the slot loci may be used to design a continuous wiping surface of the seal member. Alternatively, the surface of the seal member may be based upon the slot locus at one or more discrete positions, which can be used to generate one or more respective faces of the wiping surface. A transition ramp may be provided between adjacent faces of a multi-faceted wiping surface. Preferably, the wiping surface is substantially flush with the aerodynamic surface of the panel in one or more of these discrete positions.

The panel may be moveable from the second position to a third position in a direction away from the first position. Preferably, the seal member substantially fills the slot when the panel is in the third position, and may continue to substantially fill the slot as the panel is moved between the second and third positions.

In one embodiment, an aerofoil comprises a fixed aerofoil portion and the panel assembly of this invention, wherein the support structure is a hinge fitting and the panel is a control surface rotatably connected to the fixed aerofoil portion via the hinge fitting, and wherein the seal member is supported by the hinge fitting.

The aerofoil preferably further comprises a support bracket upon which the seal member is mounted, the support bracket being fixed to the hinge fitting. In this way, the seal member may be retro-fitted to existing hinge fittings.

The seal member is preferably detachable from the hinge fitting or support bracket for repair or replacement.

The aerofoil may be provided in an aircraft wing assembly, wherein the first position corresponds to a deployed control surface configuration, and the second position corresponds to a cruise configuration of the aircraft. Preferably, the control surface is a spoiler.

In another embodiment, an aircraft landing gear bay assembly comprises one or more panel assemblies of this invention, wherein the panel is a bay door. The first position may correspond to a door open configuration, and the second position may correspond to a door closed configuration.

BRIEF DESCRIPTION OF THE DRAWINGS

Embodiments of the invention will now be described with reference to the accompanying drawings, in which.

DETAILED DESCRIPTION OF EMBODIMENTS

Figure 1:
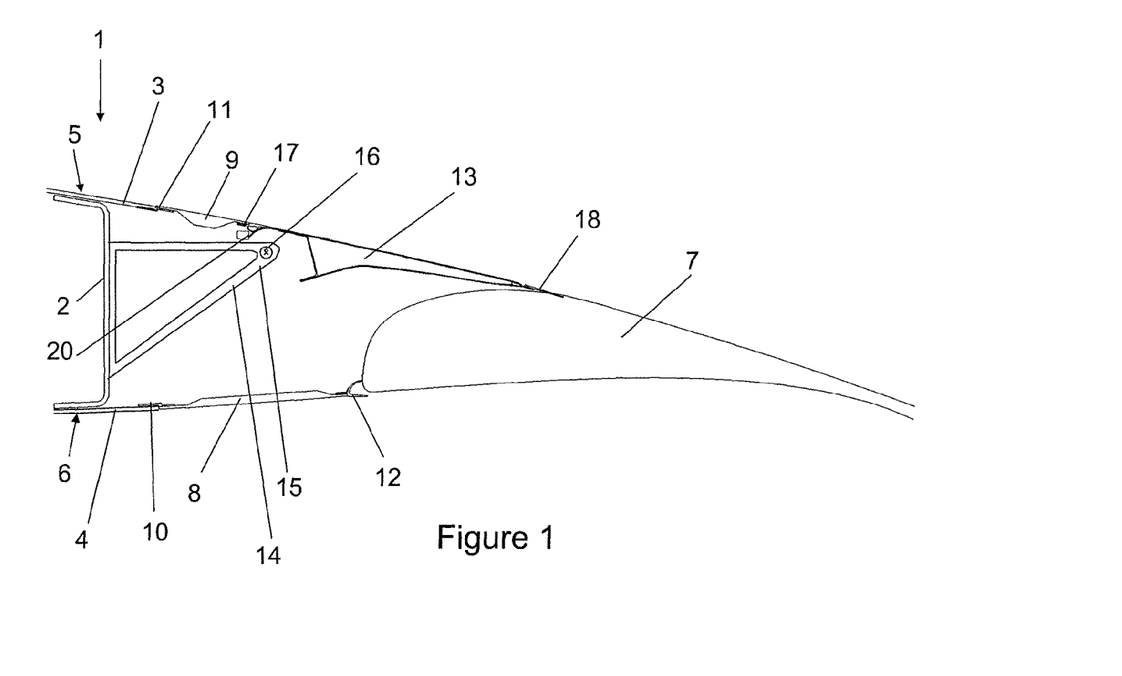
FIG. 1 illustrates a partial section view of an aircraft wing trailing edge showing a flap and a spoiler in a cruise configuration.

FIG. 1 shows a partial section view of an aircraft wing trailing edge. The wing includes a fixed wing portion 1 comprising a rear spar 2, an upper wing cover 3 and a lower wing cover 4. Outer surfaces of the upper and lower wing covers 3, 4 form upper and lower aerodynamic surfaces 5, 6, respectively.

A trailing edge drop hinge flap 7 is mounted to the fixed wing portion 1 by a drop hinge mechanism (not shown). A lower trailing edge panel 8 and an upper trailing edge panel 9 complete the wing profile and provide maintenance access to the drop hinge flap mechanism. The lower trailing edge panel 8 is connected to the lower wing cover 4 by a butt-strap 10, and the upper trailing edge panel 9 is connected to the upper wing cover 3 by a butt-strap 11. A seal member 12 seals between the lower trailing edge panel 8 and the flap 7 when the flap is in its retracted (cruise) position as shown in FIG. 1.

A drooping spoiler 13 is pivotally connected to the fixed wing portion 1 by a structural hinge rib 14. The hinge rib 14 carries a clevis hinge fitting 15 which receives a hinge fitting 36 (shown in FIGS. 10a, 11a) of the spoiler 13, and defines a hinge line 16 about which the spoiler rotates. A seal member 17 seals between the upper trailing edge panel 9 and the spoiler 13. The spoiler 13 has a flexible trailing edge member 18 which seals against an upper aerodynamic surface of the flap 7 when the flap is in its retracted position.

The flap 7 is moveable to a deployed position in which the flap is translated aft of the fixed wing portion 1 and rotated downwardly by the drop hinge mechanism (not shown). When the flap is deployed the drooping spoiler 13 is rotated downwardly about its hinge line 16 to a drooped spoiler position. In its drooped position, the spoiler 13 ensures a smooth transition between the upper aerodynamic surface 5 of the upper trailing edge panel 3 and the upper aerodynamic surface of the flap 7.

Figure 2:
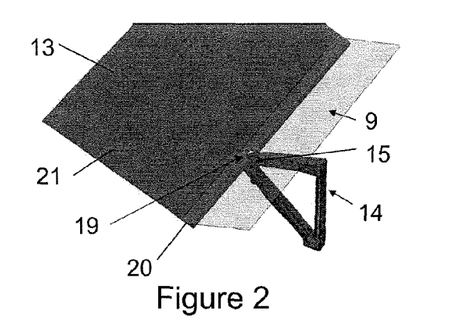
FIG. 2 illustrates schematically the need for a clearance slot in the spoiler leading edge to avoid a clash with the spoiler hinge fitting.

FIG. 2 illustrates schematically the spoiler 13, the hinge rib 14 and the upper trailing edge panel 9 (shown transparent to reveal the hinge rib). The spoiler is shown as a panel having an upper aerodynamic surface 21. The spoiler 13 is shown in its deployed position, oriented upwardly into the airflow over the upper aerodynamic surface of the wing. The spoiler is typically oriented upwardly by approximately 55 degrees from its cruise position, when fully deployed.

It can be seen from FIG. 2 that a clearance slot 19 is required in the leading edge 20 of the spoiler 13 to ensure adequate clearance between the spoiler and the hinge fitting 15 when the spoiler is oriented upwardly. The leading edge 20 of the spoiler 13 dives beneath the aerodynamic surface of the upper trailing edge panel 9 as the spoiler is deployed due to the location of the hinge line 16. It is not usually practical to cut back the hinge fitting 15 to allow clearance to the spoiler as the fatigue loads on the rib 14 or fitting 15 are likely to result in a weight increase to counteract the stress concentration caused by the cutback.

Figure 3:
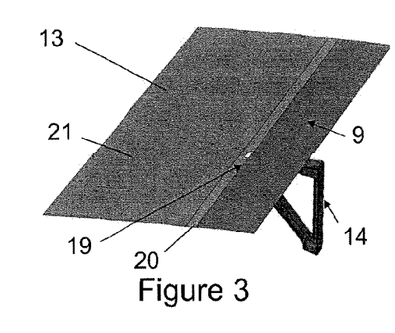
FIG. 3 illustrates the exposed slot in a cruise configuration.
Figure 4:
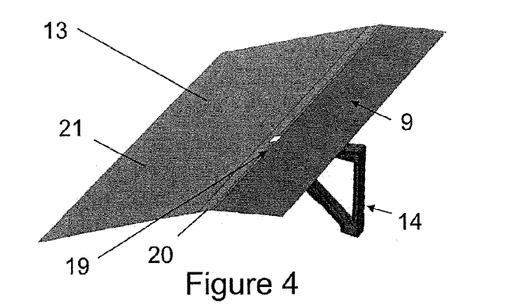
FIG. 4 illustrates the increased size of the exposed slot in a high lift configuration.

When the spoiler 13 is in its retracted (cruise) position, as shown in FIG. 3, the clearance slot 19 is exposed in the upper aerodynamic surface 21 of the spoiler 13. When the spoiler is moved to its drooped position, as shown in FIG. 4, the size of the exposed slot 19 increases further. In its drooped position, the spoiler is typically oriented downwardly by about 15 degrees with respect to the cruise position. The leading edge 20 of the spoiler is profiled (as best shown in FIG. 1) to have an arcuate portion centred about the hinge line 16. The slot 19 is cut away in this arcuate profiled portion of the leading edge 20. Although only one hinge rib 14 and slot 19 is shown in FIGS. 2 to 4, there will, in fact, typically be two such hinge ribs 14 and slots 19 for the spoiler, one at each end of the spanwise extent of the spoiler leading edge 20.

In the cruise configuration (see FIG. 3), the slot 19, if left unsealed, would cause parasitic drag and associated noise. As an aircraft spends most of its flight time in the cruise configuration, the increased fuel burn resulting from the drag due to the slots 19 for multiple spoilers 13 alone is significant. In the high lift configuration with the flaps 7 deployed and the spoilers 13 drooped, not only will the increased size of the exposed slot 19 cause further increased drag and noise, but could lead to a reduction in lift performance in this critical high lift configuration. When the flap 7 is deployed, a void is opened up between the flap and the seal member 12 in the lower aerodynamic surface of the wing. This void, together with the slot 19, creates an air path between the lower and upper aerodynamic surfaces of the wing. Leakage of so called cross bleed air from the high pressure zone on the lower aerodynamic surface to the low pressure zone on the upper aerodynamic surface would reduce the high lift performance, if the slot 19 was left unsealed.

Figure 5:
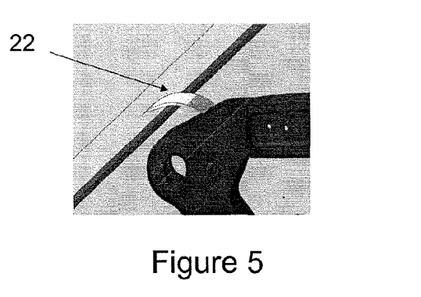
FIG. 5 illustrates the generation of a surface as the slot locus moves through its range of travel.

To seal this slot 19, it is first necessary to understand how the slot locus changes as the spoiler 13 moves throughout its range of travel between its drooped (−15 degrees) and deployed (+55 degrees) positions. FIG. 5 illustrates a theoretical surface 22 that the slot loci generates during its full range of travel. The resultant surface 22 is shown in isolation in FIG. 6.

Figure 6:
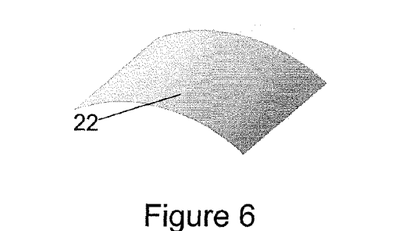
FIG. 6 illustrates the resultant surface generated from the slot loci.

According to one embodiment of this invention, the resultant curved surface 22 is used to form the upper surface of a resilient seal member, which is located within the slot 19 and fixed with respect to the hinge rib 14. The surface of the seal member forms a wiping surface which seals against the underside of the spoiler panel as it moves. The wiping surface is substantially flush with the aerodynamic surface of the spoiler 13 on either side of the slot 19. Although the seal member having the surface 22 will effectively seal the slot 19 throughout its full range of travel, it is not optimized for any particular flight configuration of the aircraft. As the aircraft spends the majority of its flight time in the cruise configuration, significant improvements in drag reduction may be realised by optimising the seal member for this flight configuration.

Figure 7:
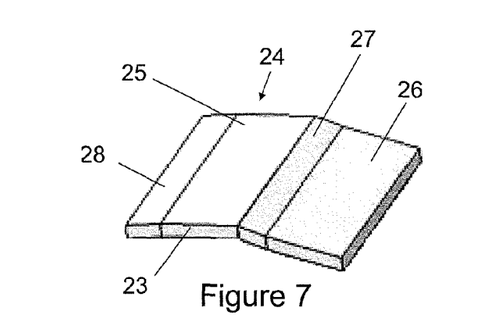
FIG. 7 illustrates a seal member optimised for two flight configurations.

FIG. 7 illustrates a preferred embodiment of a seal member 23. The seal member has a multi-faceted upper wiping surface 24. This wiping surface 24 includes a cruise optimized surface 25 and a high-lift optimized surface 26. Between the surfaces 25 and 26 is a transition ramp 27 to bridge between the surfaces 25 and 26. Forward of the surface 25 is a lead-in surface 28. The lead-in surface has a curvature to match that of the spoiler leading edge profile 20.

When the spoiler 13 is in its retracted (cruise) position the cruise optimized surface 25 will be substantially flush with the aerodynamic surface of the spoiler on either side of the slot 19. The lead-in surface 28 will be partially exposed to the airflow in the cruise configuration, and partially covered by a trailing edge of the seal member 17. The lead-in surface 28 ensures there is no forward facing aerodynamic step in the upper surface of the seal member 23. The transition ramp 27 and the high-lift optimized surface 26 will not be exposed to the airflow in the cruise configuration, as they will be located beneath the spoiler 13, aft of the slot 19. In this way, the seal member 23 substantially fills the slot 19 in the cruise configuration.

When the spoiler is in its drooped (high-lift) position the effective size of the slot 19 is increased. The high-lift optimized surface 26 will be substantially flush with the aerodynamic surface of the spoiler on either side of the slot 19. The aft portion of the lead-in surface 28 will remain exposed, as will the cruise optimized surface 25, but the cruise optimized surface 25 will no longer be flush with the aerodynamic surface of the spoiler in the drooped position. The transition ramp 27 will now also be exposed to the airflow. In this way, the seal member 23 substantially fills the slot 19 in the high-lift configuration.

It can be seen from the above that in the cruise configuration, the entire exposed upper surface of the sealing member 23 is substantially flush with the spoiler aerodynamic surface, whereas this is not the case in the high-lift configuration. In other words, the seal member has been optimized for the cruise configuration, as this is where the greatest benefits of drag reduction can be realized. However, it is important that in both the cruise and the high-lift configurations, the seal member 23 provides an effective seal for the slot 19.

The seal member 23 may be made of plastics material, such as PTFE or Nylon, or elastomeric material, but could be made of virtually any suitable material to provide a resilient member. The wiping surface 24 of the seal member 23 does not experience a great deal of wear from contact with the underside of the spoiler panel around the slot 19. Along the lateral edges of the seal member 23, a flexible sealing strip may be provided, such as a P-seal, to provide enhanced air-tight sealing with the lateral edges of the slot 19.

Figure 8:
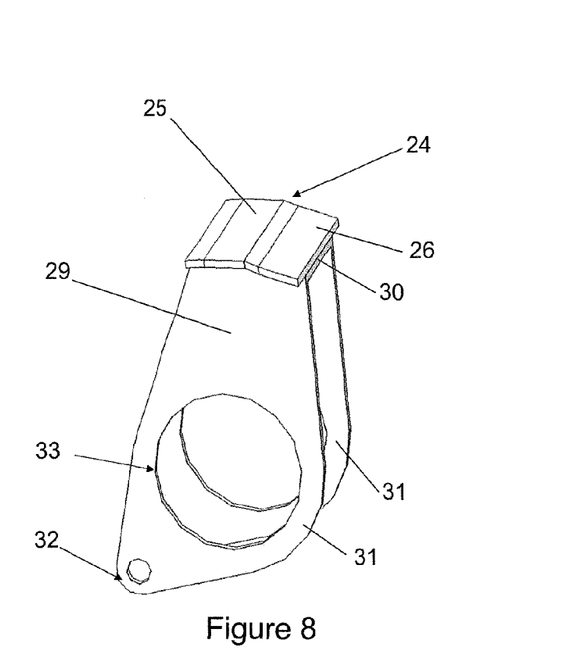
FIG. 8 illustrates the seal member mounted on a support bracket.

The seal member 23 is fixed with respect to the fixed wing portion 1, and so does not move with movement of the spoiler 13. The seal member 23 is conveniently mounted on a support bracket 29, as shown in FIG. 8, for attachment to the hinge fitting 15.

The support bracket 29 includes a mounting plate 30 for receiving the seal member 23, and a pair of downwardly extending legs 31. The legs 31 each include a fixing hole 32 for fixing the support bracket to the hinge fitting 15, and an aperture 33 for receiving a hinge pin. The support bracket may be made of Aluminium, or virtually any suitable metallic or plastics material. The sealing member 23 is removable from the support bracket 29 for repair or maintenance purposes.

Figure 9:
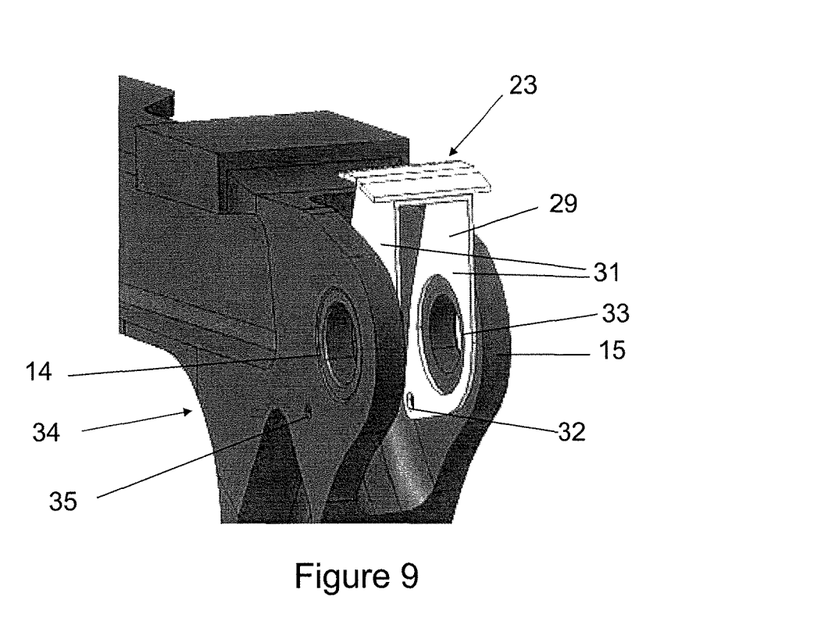
FIG. 9 illustrates the support bracket fixed to the spoiler hinge fitting.

FIG. 9 illustrates the support bracket 29 having the sealing member 23 fixed to the clevis hinge fitting 15 on the hinge rib 14. The apertures 33 in the legs 31 of the support bracket align with apertures 34 in the clevis for receiving the hinge pin (not shown). The legs 31 are attached to inner bearing faces of the hinge fitting clevis. The support bracket 29 is fixed to the hinge fitting 15 by passing bolts (not shown) through the fixing holes 32 and corresponding fixing holes 35 in the hinge fitting. Alternatively, the legs of the support bracket 29 may be cranked such that the lower part of the legs can be attached to outer bearing surfaces of the hinge fitting clevis.

The support bracket 29 having the seal member 23 may be retrofitted to existing aircraft hinge fittings if there is sufficient space. The support bracket may alternatively be integrally formed with a modified hinge rib.

Although the support bracket 29 is described above as being fixed with respect to the hinge rib 14, in an alternative embodiment it may be biased to its operative position such that in the event of failure it may be moved against the bias to prevent jamming of the spoiler 13. A suitable bias element would be a spring.

Figure 10A:
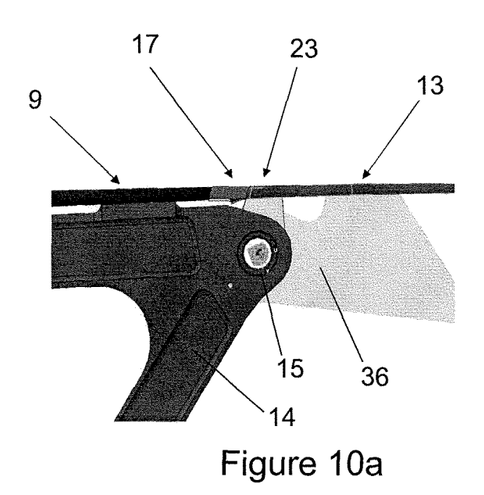
FIG. 10a illustrates a partial side view and FIG. 10b illustrates a partial 3-dimensional view from above of an aircraft wing showing the sealed spoiler slot in the cruise configuration.
Figure 10B:
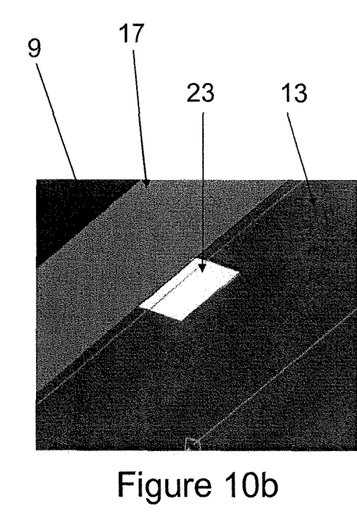
Figure 11A:
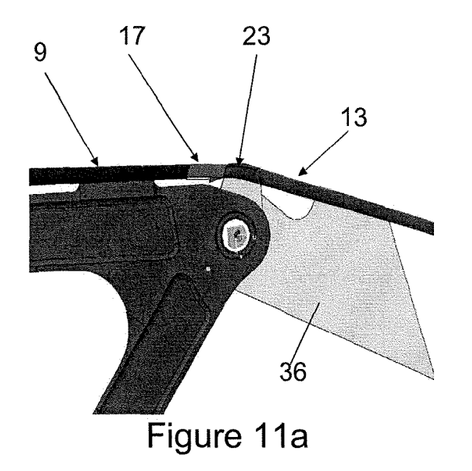
FIG. 11a illustrates a partial side view and FIG. 11b illustrates a partial 3-dimensional view from above of the aircraft wing showing the sealed spoiler slot in the high lift configuration.
Figure 11B:
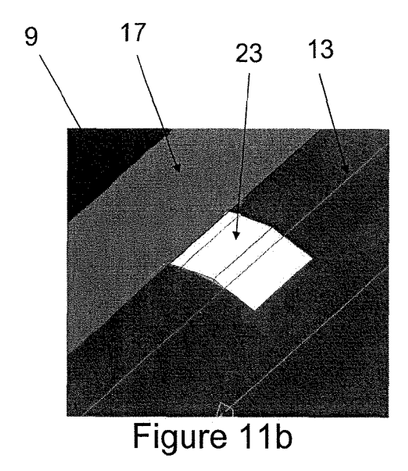

FIGS. 10a and 10b show the seal member 23 in operation with the spoiler 13 in the cruise position, and FIGS. 11a and 11b show the spoiler in the drooped position. The exposed portions of the wiping surface 24 of the seal member 23 can be seen clearly. The spoiler hinge fitting 36 is rotatable about the hinge line 16 with respect to the hinge fitting 15.

When the spoiler 13 is deployed upwardly (from the cruise position), the trailing edge of the seal member 17 will be deflected upwardly so at least partially covering the slot 19 until the extent of deployment is such that the slot 19 is beneath the upper aerodynamic surface of the wing.

In the embodiments described above the panel is an aircraft spoiler. However, the panel may be any other type of flight control surface for an aircraft (such as an elevator or rudder), or a door for an aircraft landing gear bay.

Figure 12:
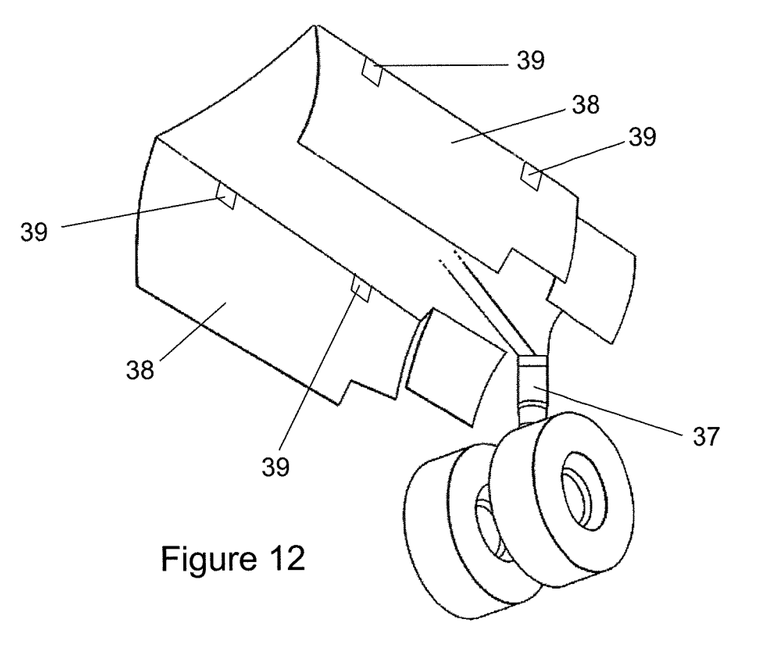
FIG. 12 illustrates an aircraft landing gear bay with doors in an open position.

FIG. 12 shows an aircraft landing gear bay for housing a landing gear 37, when retracted. The bay doors 38 have slots

39. The landing gear bay doors 39 each have an aerodynamic surface 40 and are pivotally mounted to the remainder of the aircraft by a hinge fitting (not shown), in much the same way as the spoiler described above. Sealing of the slots in the bay doors around the hinges may therefore be effected in a similar manner to that set out above, such that when the bay doors are closed, the slots are sealed. Since landing gear doors are generally only moved between open and closed positions, the seal member need only have one wiping surface to seal the slot in the door closed position.

Although the invention has been described above with reference to one or more preferred embodiments, it will be appreciated that various changes or modifications may be made without departing from the scope of the invention as defined in the appended claims.

The invention claimed is:

1. A panel assembly for an aircraft, the assembly comprising a panel rotatably connected to a support structure and moveable between a first position and a second position, the panel having an aerodynamic surface with a through-thickness slot extending in a direction substantially perpendicular to the aerodynamic surface in one edge thereof which receives a portion of the support structure when the panel is in the first position, and the assembly further comprising a resilient seal member, a portion of which is located within and occupies the slot when the panel is in the second position.

2. A panel assembly according to claim 1, wherein the seal member substantially fills the slot when the panel is in the second position.

3. A panel assembly according to claim 1, wherein the panel is moveable from the second position to a third position in a direction away from the first position.

4. A panel assembly according to claim 3, wherein the seal member substantially fills the slot when the panel is in the third position.

5. A panel assembly according to claim 4, wherein the seal member continues to substantially fill the slot as the panel is moved between the second and third positions.

6. A panel assembly according to claim 1, wherein the seal member has a surface substantially flush with the aerodynamic surface of the panel when the panel is in the second position.

7. A panel assembly according to claim 3, wherein the seal member has a multi-faceted surface, each facet being substantially flush with the aerodynamic surface of the panel when the panel is in one of a plurality of discrete, respective positions.

8. A panel assembly according to claim 7, wherein the multi-faceted surface has a facet substantially flush with the aerodynamic surface of the panel when the panel is in the second and third positions, respectively.

9. A panel assembly according to claim 7, wherein the seal member further includes a transition ramp between adjacent facets.

10. A panel assembly according to claim 3, wherein the seal member has a surface corresponding to a trace of the slot loci as the panel is moved between the second and third positions.

11. An aerofoil comprising a fixed aerofoil portion and the panel assembly according to claim 1, wherein the support structure is a hinge fitting and the panel is a control surface rotatably connected to the fixed aerofoil portion via the hinge fitting, and wherein the seal member is supported by the hinge fitting.

12. An aerofoil according to claim 11, further comprising a support bracket upon which the seal member is mounted, the support bracket being fixed to the hinge fitting.

13. An aircraft wing assembly comprising the aerofoil according to claim 11, wherein the first position corresponds to a deployed control surface configuration, and the second position corresponds to a cruise configuration of the aircraft.

14. An aircraft wing assembly according to claim 13, wherein the control surface is a spoiler.

15. An aircraft landing gear bay assembly comprising one or more panel assemblies according to claim 1, wherein the panel is a bay door.

16. An aircraft landing gear bay assembly according to claim 15, wherein the first position corresponds to a door open configuration, and the second position corresponds to a door closed configuration.

* * * * *